United States Patent [19]

Robbins, III et al.

[11] Patent Number: 5,894,965
[45] Date of Patent: Apr. 20, 1999

[54] MEASURING DISPENSING CAP WITH SPRING BIASED FLIP TOP

[75] Inventors: Edward S. Robbins, III, 2802 E. Avalon Ave., Muscle Shoals, Ala. 35662; Craig Saunders, Rocky River; Jesse Carlson, Cleveland, both of Ohio; Morris Binder, Baltimore, Md.

[73] Assignee: Edward S. Robbins, III, Muscle Shoals, Ala.

[21] Appl. No.: 08/901,898

[22] Filed: Jul. 29, 1997

[51] Int. Cl.⁶ ............................................. G01F 11/26
[52] U.S. Cl. .................... 222/444; 222/449; 222/450; 222/451; 222/452; 222/456; 222/517
[58] Field of Search ........................... 222/517, 449, 222/444, 450, 451, 452, 454, 456, 476

[56] References Cited

U.S. PATENT DOCUMENTS

| | | | |
|---|---|---|---|
| D. 323,781 | 2/1992 | Hamly et al. | D9/372 |
| D. 350,877 | 9/1994 | VanValkenburg et al. | D7/612 |
| 1,273,012 | 7/1918 | Souther . | |
| 1,589,107 | 6/1926 | Campbell, Jr. | 222/517 |
| 1,714,368 | 5/1929 | Hobson . | |
| 1,802,284 | 4/1931 | Stoddard . | |
| 2,214,437 | 9/1940 | Punte et al. | 206/42 |
| 2,272,798 | 2/1942 | Hacmac | 65/31 |
| 2,339,644 | 1/1944 | Lucas | 221/95 |
| 2,370,820 | 3/1945 | Stott | 222/454 |
| 2,449,285 | 9/1948 | Ekstrom | 222/548 |
| 2,784,884 | 3/1957 | Borie, Jr. | 222/336 |
| 2,804,103 | 8/1957 | Wall | 141/381 |
| 2,811,281 | 10/1957 | Donovan | 222/81 |
| 2,840,124 | 6/1958 | Greene | 141/381 |
| 2,844,266 | 7/1958 | Hofe | 215/64 |
| 2,969,167 | 1/1961 | Libit | 222/512 |
| 2,985,343 | 5/1961 | Mask | 222/442 |
| 3,020,659 | 2/1962 | Paulini . | |
| 3,033,420 | 5/1962 | Thomas et al. | 222/1 |
| 3,140,799 | 7/1964 | Mehr | 222/131 |
| 3,168,223 | 2/1965 | Capers | 222/158 |
| 3,209,961 | 10/1965 | Wassell | 222/443 |
| 3,424,355 | 1/1969 | Blumen | 222/450 |
| 3,486,665 | 12/1969 | La Croce | 222/480 |
| 3,853,250 | 12/1974 | Alpern | 222/517 |
| 3,860,111 | 1/1975 | Thompson | 206/534 |
| 3,948,105 | 4/1976 | Johnson, Jr. | 73/427 |
| 4,069,935 | 1/1978 | Hampel | 215/203 |
| 4,079,859 | 3/1978 | Jennings | 222/1 |
| 4,083,467 | 4/1978 | Mullins et al. | 220/90.4 |
| 4,102,477 | 7/1978 | Yoon | 222/438 |
| 4,144,989 | 3/1979 | Joy | 222/438 |
| 4,164,301 | 8/1979 | Thayer | 220/253 |
| 4,209,100 | 6/1980 | Uhlig | 215/216 |
| 4,292,846 | 10/1981 | Barnett | 73/427 |
| 4,298,038 | 11/1981 | Jennings | 141/2 |
| 4,318,500 | 3/1982 | Melikian | 222/425 |
| 4,346,823 | 8/1982 | Eppenbach | 222/453 |
| 4,376,497 | 3/1983 | Mumford | 222/153 |
| 4,399,928 | 8/1983 | Klingler | 220/335 |
| 4,408,703 | 10/1983 | Libit | 222/284 |
| 4,544,063 | 10/1985 | Neward | 206/540 |
| 4,580,687 | 4/1986 | Lewis | 215/237 |
| 4,606,481 | 8/1986 | Conti et al. | 222/562 |
| 4,610,371 | 9/1986 | Karkiewicz | 220/266 |

(List continued on next page.)

*Primary Examiner*—Andres Kashnikow
*Assistant Examiner*—David Deal
*Attorney, Agent, or Firm*—Nixon & Vanderhye P.C.

[57] ABSTRACT

A measuring/dispensing cap for a container comprising a peripheral side wall and a pivotable flip top movable between closed and open positions, the flip top mounted for pivotal motion about a horizontal hinge axis wherein the hinge axis separates a closure panel of the flip top from a push panel of the flip top; a first panel within the side wall having a first free edge in substantially vertical alignment with the hinge axis; a second weir panel having a weir edge extending parallel to and laterally spaced from the first free edge, thus establishing a weir opening, the closure panel and the weir panel along with a portion of the peripheral side wall defining a measuring chamber within the cap, adapted to receive contents of a container passing through the weir opening.

17 Claims, 17 Drawing Sheets

U.S. PATENT DOCUMENTS

| | | | |
|---|---|---|---|
| 4,613,057 | 9/1986 | Sacchetti et al. | 221/265 |
| 4,635,828 | 1/1987 | Kaufman | 222/185 |
| 4,637,529 | 1/1987 | Knight | 222/452 |
| 4,643,881 | 2/1987 | Alexander et al. | 422/265 |
| 4,646,948 | 3/1987 | Jennings | 222/454 |
| 4,691,821 | 9/1987 | Hofmann | 206/216 |
| 4,693,399 | 9/1987 | Hickman et al. | 222/480 |
| 4,714,181 | 12/1987 | Kozlowski et al. | 222/480 |
| 4,723,693 | 2/1988 | DeCoster | 222/483 |
| 4,776,501 | 10/1988 | Ostrowsky | 222/517 |
| 4,802,597 | 2/1989 | Dubach | 215/307 |
| 4,898,292 | 2/1990 | VerWeyst et al. | 215/237 |
| 4,921,146 | 5/1990 | Salzmann | 222/473 |
| 4,930,688 | 6/1990 | Arona-Delonghi | 222/484 |
| 4,936,494 | 6/1990 | Weidman | 222/480 |
| 4,955,513 | 9/1990 | Bennett | 222/480 |
| 4,961,521 | 10/1990 | Eckman | 222/142.5 |
| 5,011,048 | 4/1991 | Mark | 222/455 |
| 5,064,106 | 11/1991 | Butler et al. | 222/456 |
| 5,085,331 | 2/1992 | Groya et al. | 215/245 |
| 5,139,178 | 8/1992 | Arch et al. | 222/326 |
| 5,139,181 | 8/1992 | VerWeyst | 222/480 |
| 5,205,424 | 4/1993 | Gaspar | 215/210 |
| 5,411,186 | 5/1995 | Robbins, III | 222/442 |
| 5,465,871 | 11/1995 | Robbins, III | 222/23 |
| 5,467,903 | 11/1995 | Sorensen et al. | 222/455 |
| 5,487,494 | 1/1996 | Robbins, III | 222/158 |
| 5,489,049 | 2/1996 | Robbins, III | 222/448 |
| 5,509,582 | 4/1996 | Robbins, III | 222/158 |
| 5,518,152 | 5/1996 | Burcham et al. | 222/452 |
| 5,671,875 | 9/1997 | Robbins, III et al. | 222/452 |

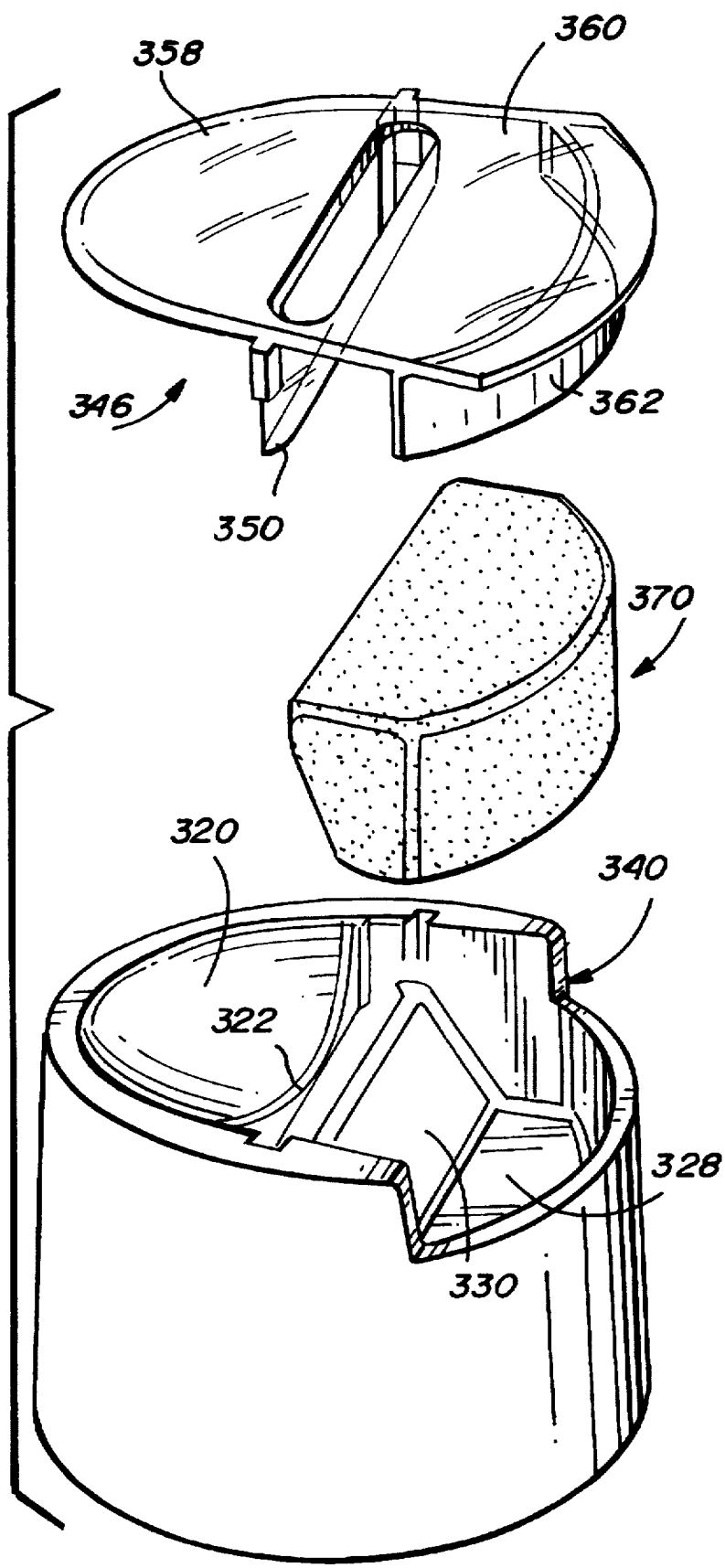

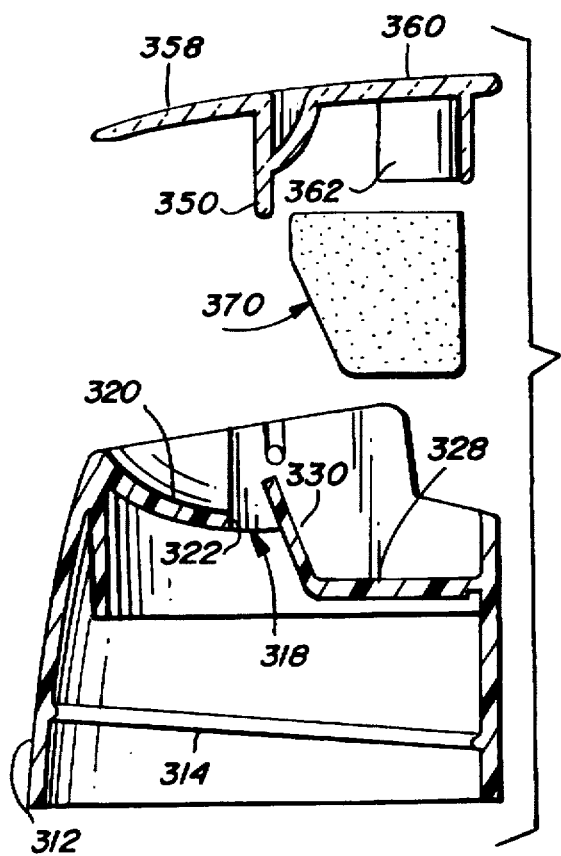
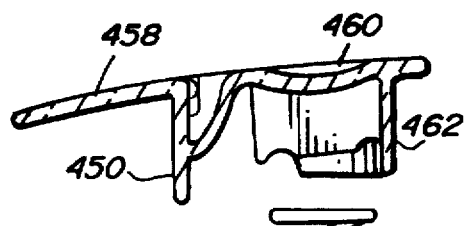
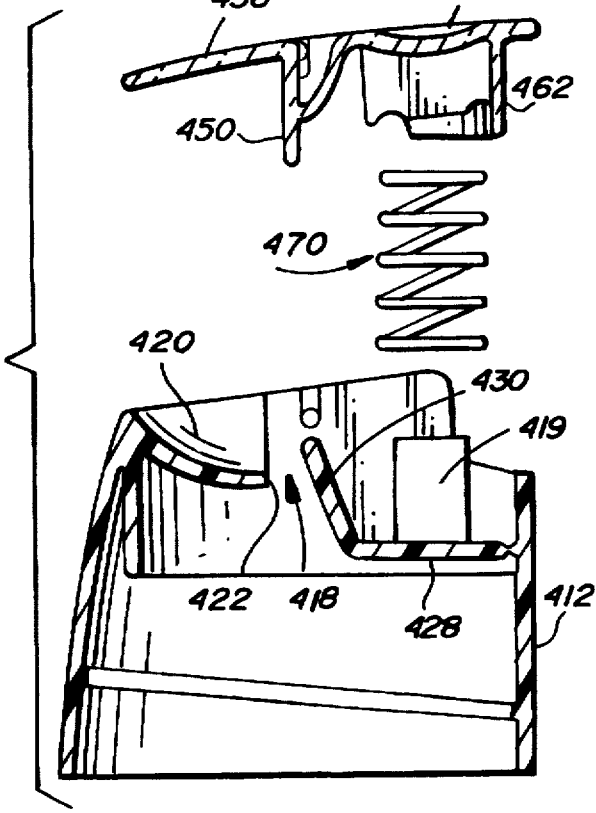

MEASURING DISPENSING CAP WITH SPRING BIASED FLIP TOP

RELATED APPLICATIONS

This application is related to copending application Ser. Nos. 08/557,559 filed Nov. 14, 1995 and 08/677,350 filed Jul. 2, 1996.

BACKGROUND AND SUMMARY OF THE INVENTION

The present invention relates generally to dispensing containers and more specifically, to dispensing cap constructions enabling accurately measured amounts of container contents (in granular, particulate, powdered or liquid form) to be dispensed from the cap.

Dispensing containers are, of course, well known and are used in many different industries for many different purposes. One such use is in the food industry, and a specific example includes jars and other similar containers which contain solid foods (such as spices, sugar substitutes, concentrates, etc.) in particulate, granular or powder-like form. Typically, a measuring spoon or separate measuring cup is utilized in conjunction with the jar or container when accurate amounts are to be obtained.

The present invention eliminates the need for measuring spoons or cups by providing a closure, which serves as its own measuring device, for use with an otherwise conventional container. While the incorporation of a measuring function into a container/closure construction for the discharge of desired amounts of the container contents is not new (see for example, U.S. Pat. Nos. 1,802,284; 2,804,103; 3,860,111; 4,613,057 and 4,635,828), the present invention provides an improved and simplified structure for accomplishing this result.

More recently, improved dispensing type measuring caps or closures have been disclosed in commonly owned U.S. patent application Ser. No. 08/288,896 filed Aug. 10, 1994, now U.S. Pat. No. 5,509,582 issued Apr. 23, 1996, and in commonly owned U.S. Pat. No. 5,465,871. Application Ser. Nos. 08/557,559 and 08/677,350 mentioned above disclose further iterations of dispensing type measuring caps or closures which incorporate flat pivot type dispensing doors or panels in combination with internal measuring chambers including weir dams or panels. Some embodiments include a measuring chamber closing flange, operable when the dispensing door or panel is open, to prevent excess material from being transferred into the measuring chamber.

In accordance with the present invention, further improved measuring/dispensing cape or closures are provided which incorporate a flip top cap and a built-in shut-off blade, with the flip top spring biased to a normally closed position. Other improvements in overall design enhance the performance and usability of the cap.

In exemplary embodiments, the plastic measuring/dispensing closure includes a flip top which is pivotably mounted on the upper end of a peripheral closure skirt. Located within the confines of the radially outer closure skirt, there is a second, radially inner skirt which is adapted to engage the upper edge of an associated container. Within this inner skirt, there is a first internal panel which closes off approximately half of the opening at the upper end of the inner skirt. A second internal weir dam panel terminates at a substantially straight weir edge (when viewed in plan) which is laterally spaced from and parallel to the first free edge of the angled panel portion, thereby defining a weir opening between the two edges. The weir dam panel, in combination with the closure portion of the flip top form a measuring chamber from which measured amounts of container contents can be dispensed through the closure panel portion of the flip top, but only after the measured amount has been transferred from the container to the measuring chamber through the weir opening. The flip top is bifurcated by a hinge axis defining a closure panel on one side of the hinge axis and a push panel on the other side of the hinge axis. Of course, the shape of the flip top conforms generally to the shape of the peripheral skirt at the uppermost end thereof so that the flip top effectively seals the closure when the flip top is in the closed position. In the exemplary embodiments, the flip top and the skirt openings are somewhat rectangular in shape, with a gradual taper at the discharge end so as to provide a rounded "arrow head" shape at the discharge end. The closure skirt is round in its lower threaded portion and gradually transitions to the rounded arrow-head shape at the upper edge thereof. The precise shape of the flip top, however, may be varied as desired, depending on the particular application.

In one exemplary embodiment, a substantially straight cut-off blade, lying parallel to the weir edge, extends downwardly from a lower surface of the flip top immediately adjacent or centered on the hinge axis. This closure blade lies fully engaged with and along the free edge of the first internal panel when the flip top is in its closed position. When the push panel portion of the flip top is pressed downwardly to open the closure portion of the flip top, the shut-off blade moves into engagement with the parallel weir edge to thereby shut off the measuring chamber so that no additional amount of contents from the container can flow into the measuring chamber as the measured amount is dispensed from the measuring cap.

It is another feature of this invention, that the flip top be normally biased to a closed position. This can be accomplished in several ways. In one embodiment of the invention, a flexible, resilient spring panel extends downwardly from a lower surface of the flip top, substantially parallel to the shut-off blade. This flexible panel is fully engaged along an upwardly angled portion of the first interior panel when the flip top is closed. When the push panel portion is pressed downwardly, further flexing of this spring panel creates a closing bias to the flip top when the push panel portion is released.

In a variation of the first exemplary embodiment, a spring is formed by an integral, bendable spring panel attached to the end of the push panel portion which is remote from the shut-off blade, and which is doubled back on itself about a living hinge. Thus, the spring takes on a substantially C or wedge-shaped configuration in use, again biasing the flip top to a normally closed position.

In another variation of the first exemplary embodiment, a separate and discrete substantially C-shaped spring panel is inserted between the push panel portion and the internal panel within the closure skirt.

In still another variation, a spring is provided in the form of a die cut foam block shaped to conform to the space between the push panel portion of the flip top and the first internal panel within the peripheral skirt of the closure. The block is resiliently compressed when the push panel is pressed downwardly, creating a bias back to the closed position.

In still another variation, a coil spring is inserted between the push panel portion of the flip top and the first internal panel within the closure skirt. In this embodiment, additional means are provided to locate and retain the coil spring in place to normally bias the flip top to the closed position.

In a second and preferred embodiment of the invention, the internal closure panels are re-designed to insure that none of the container contents clog or otherwise impede the flip top as it moves between closed and open positions. In this preferred arrangement, the weir panel terminates at a vertical flange with a free horizontal edge laterally offset and slightly above a generally horizontal, parallel edge of the adjacent internal panel. At the same time, the underside of the flip top is formed with a combined shut-off and sealing arrangement which includes a downwardly projecting box-like member or beam including a pair of parallel vertical walls connected by a curved bottom wall, the hollow beam configuration appearing from above the flip top as a rectangular groove or recess. With this arrangement, the shut-off/sealing beam is always engaged with the horizontal edge of the internal panel, during both closing and opening movements of the flip top, while engaging the weir edge and thus shutting off flow into the measuring chamber when the flip top is opened.

Accordingly, in its broader aspects, the present invention provides a measuring/dispensing cap for a container comprising a peripheral side wall and a pivotable flip top movable between closed and open positions, the flip top mounted for pivotal motion about a horizontal hinge axis wherein the hinge axis separates a closure panel of the flip top from a push panel of the flip top; a first panel within the side wall having a first free edge in substantially vertical alignment with the hinge axis; a second weir panel having a weir edge extending parallel to and laterally spaced from the first free edge, thus establishing a weir opening, the closure panel and the weir panel along with a portion of the peripheral side wall defining a measuring chamber within the cap, adapted to receive contents of a container passing through the weir opening.

Other objects and advantages of the invention will become apparent from the detailed description which follows.

BRIEF DESCRIPTION OF THE DRAWINGS

FIG. 12 is an exploded perspective view of a measuring/dispensing cap in accordance with still another variation of the first embodiment of the invention;

FIG. 13 is an exploded side section corresponding to FIG. 12;

FIG. 15 is an exploded side section corresponding to FIG. 14.

DETAILED DESCRIPTION OF THE DRAWINGS

Figure 2:
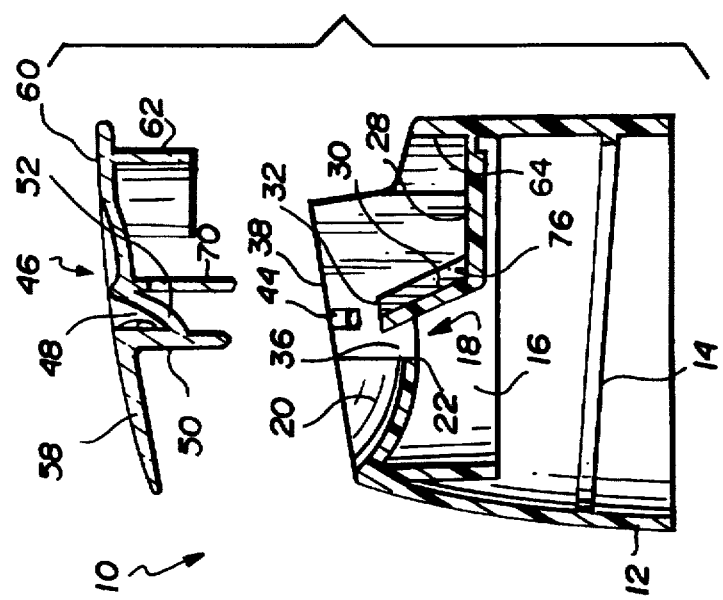
FIG. 2 is an exploded side section corresponding to FIG. 1.
Figure 1:
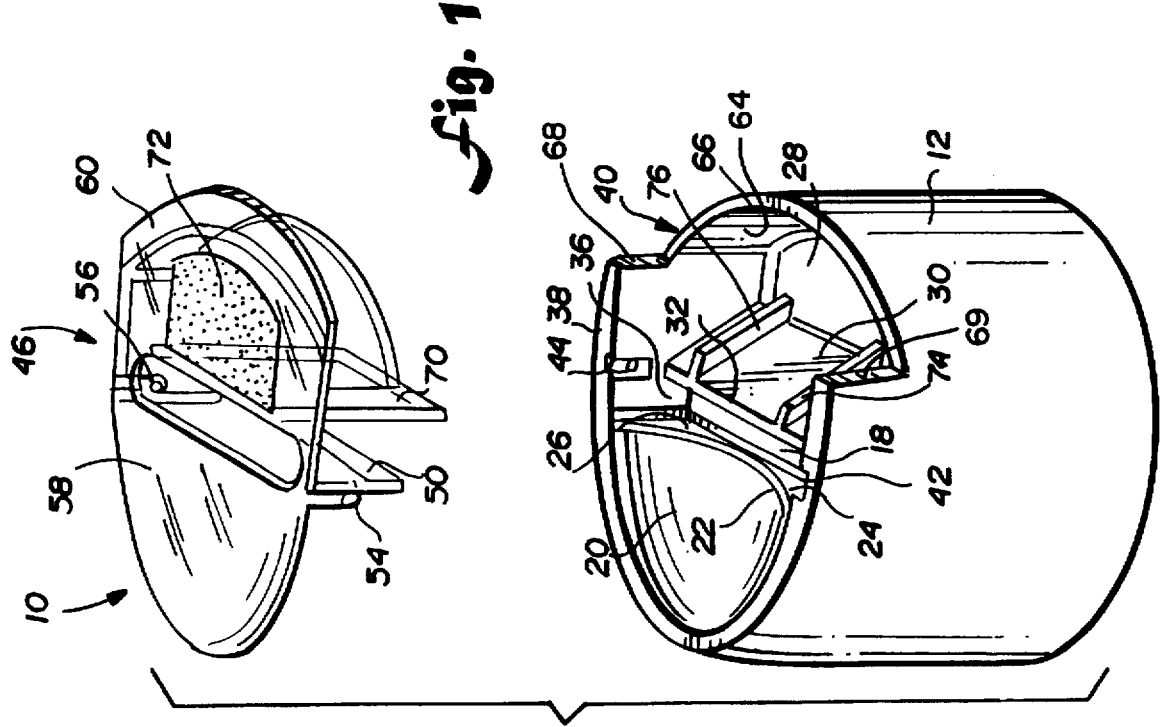
FIG. 1 is an exploded perspective view of the measuring/dispensing cap in accordance with a first exemplary embodiment of the invention.
Figure 3:
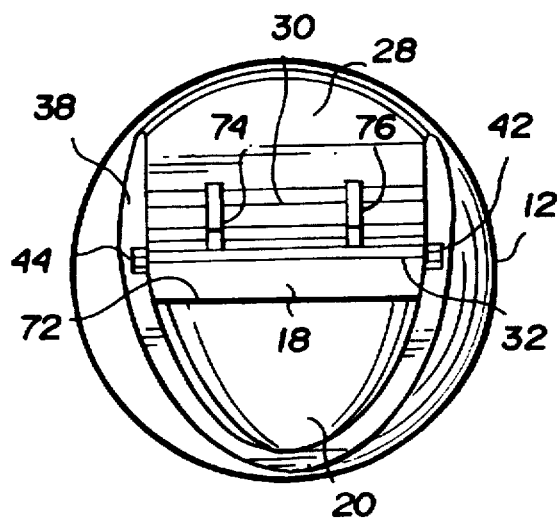
FIG. 3 is a top plan view of the cap with the flip top omitted.
Figure 4:
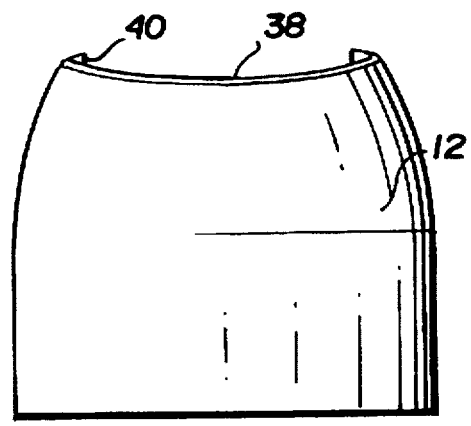
FIG. 4 is a rear elevation of the cap with the flip top omitted.
Figure 5:
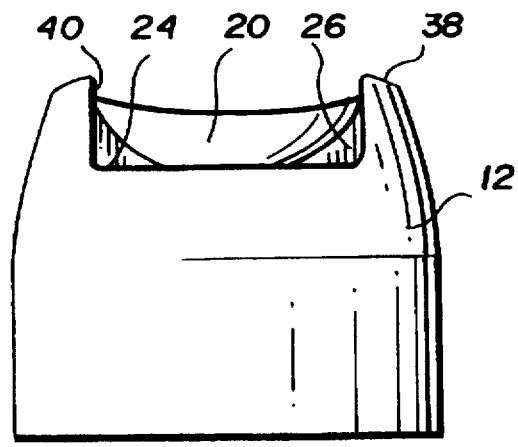
FIG. 5 is a front elevation of the cap with the flip top omitted.
Figure 6:
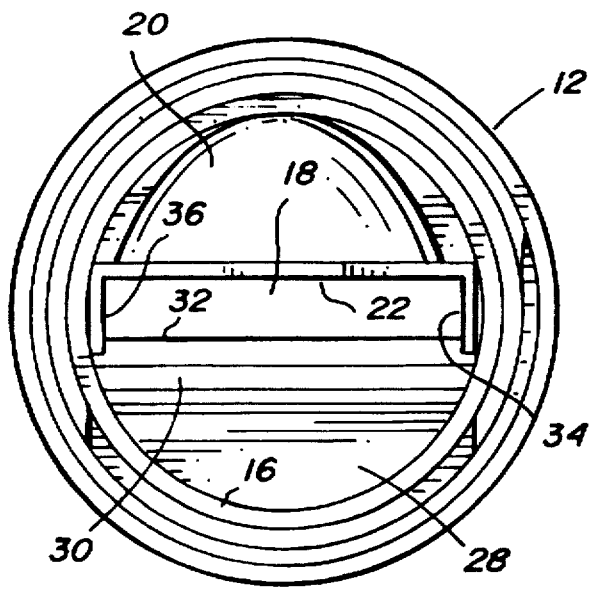
FIG. 6 is a bottom plan view of the closure with the flip top omitted.
Figure 7:
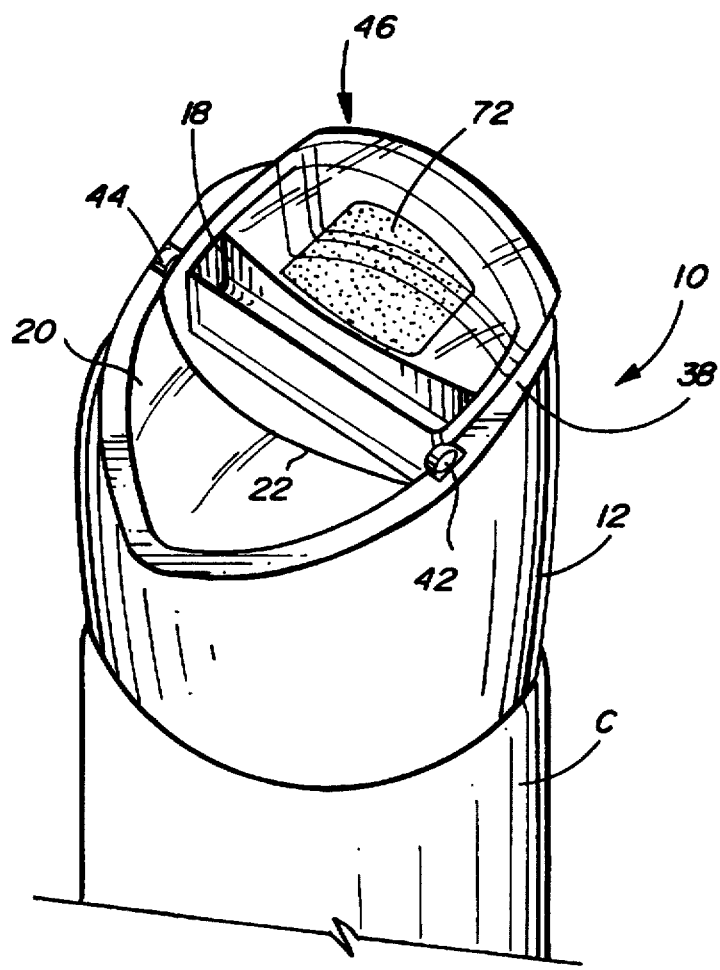
FIG. 7 is a perspective view of the closure of FIG. 1, with the flip top mounted in place.

With reference to FIG. 1, the closure 10 has a peripheral or outer skirt 12 provided on its interior surface with a thread 14 adapted for conventional threaded engagement with a mating thread on the upper open end of an associated container C (FIG. 7). Conventional snap-fit arrangement could also be employed. The upper end of the closure has a specifically formed geometry which permits dispensing of measured amounts of container contents as described in more detail below.

An internal, radially inner skirt 16 is adapted to engage the upper edge of the container C to insure that the container contents flow only to the desired location within the closure. The internal geometry within the skirt creates an elongated, rectangularly shaped, substantially diametrical weir opening 18. The latter has a length approximately the diameter of the radially inner skirt 16. This opening 18 is created by two distinct, internal wall components. The first is a curved weir panel 20 extending downwardly from the periphery of the closure (at a location where the outer skirt 12 merges with the inner skirt 16), truncated at a weir edge 22 which forms one side of the opening 18. This edge 22 is "squared off" by integral gussets 24, 26 (FIGS. 1–5). Thus, the edge is straight when viewed in plan as well as in elevation.

From the opposite side of the radially inner skirt 16, there extends a substantially horizontal panel 28. A flat, angled portion 30 of the panel 28 extends upwardly to a free edge 32 which forms a second side of the weir opening 18. Note that edge 32 is slightly higher than the weir edge 22. These two sides are connected by vertical end surfaces 34, 36, thus establishing the substantially rectangular slot-like shape of the weir opening 18.

Finally, with regard to the internal cap geometry, an upper edge portion 38 of the radially outward skirt 12 angles upwardly from the dispensing end, beyond the center to a recess 40 cut from the skirt. Diametrically opposed notches 42, 44 provide pivot locations for the flip top lid 46, described further below. The recess 40 allows room for the flip top to be moved between open and closed positions as also described below.

The flip top 46 has an overall shape, in plan, similar to the corresponding plan shape of the closure at its upper end. The flip top is traversed by a groove or recess 48 which is formed by a flat, straight vertically oriented shut-off blade 50 and a curved wall 52. Pivot pins 54, 56 are integrally formed with the lid and extend outwardly from the side walls of the lid, the pins adapted for snap fit engagement within notches 42, 44, thereby defining a pivot axis along the back edge 32 of the weir opening.

The groove or recess 48 separates the flip top into a closure panel 58 and a push panel 60 which are also on opposite ends of the pivot axis established by pins 54, 56. The closure panel 58, in combination with the weir panel 20 form a measuring chamber, the size of which is selected to hold a predetermined volume of container contents, e.g., 1 oz. The volume may be enlarged, however, with volume indicators placed on the closure panel 58 so that the user can accurately transfer the desired amount into the chamber. In this regard, at least the flip top 46 is preferably made for suitable transparent plastic material.

Because of the location of pivot pins 54, 56, the closure panel 58 will be pivoted to an open position when the push panel 60 is pressed downwardly. Adjacent the rear of push panel 60 (that end which is remote from the groove 48), there is a depending skirt 62 which is curved about its periphery to substantially match (but fit inside) the curvature of the closure skirt at 64, i.e., along the edge 66 of recess or cut-out 40. The skirt 62 extends peripherally just beyond the vertical edges 68, 69 of the cut-out 40 so that when the lid is in place, the space between the push panel 60 and the panel 28 is essentially sealed from debris. Extending vertically downwardly from the forward edge (adjacent groove 48) of the push panel 60, there is a flexible spring 70 which, in its normal configuration, is shaped as a flat rectangular sheet or panel. The spring 70 is substantially parallel to the shut-off blade 50 and the space between is pre-set so that, when the lid is closed, the shut-off blade engages the edge 32 of angled portion 30 while the lower edge of spring 70 engages the lower portion of angled panel portion 30.

When the push panel 60 is depressed to open the dispensing panel 58, the shut-off blade 50 pivots into sealing engagement with the weir edge 22. At the same time, spring 70 is flexed by the clockwise movement then into biased engagement with the angled panel 18. It will be appreciated that, upon release of the push panel 60, the dispensing panel 58 will be urged back to the normally closed position by the spring 70. The push panel 60 may have a textured press area 72 if desired, and other friction enhancing techniques may be used as well. Also note that a pair of ribs 74, 76 along panel 30 serve to locate the spring panel 70.

Once the desired amount is transferred to the measuring chamber through the weir opening 18 by tilting the container, the container may be tilted in the opposite direction as the push panel 60 is pressed downwardly to open the flip top 46. During this motion, the shut-off blade 50 seals the chamber from any further transfer of contents through the weir opening. After the measured amount has been dispensed, the push panel 60 is released so that the flip top 46 is returned to its closed position by the resilient spring panel 70. The user is then free to fill the measuring chamber again with a predetermined amount of material and to dispense it in the same manner as described above. This construction is particularly advantageous for dispensing predetermined amounts of container contents on a regular and repeatable basis, such as the sweetener application mentioned above. The operation as described is substantially the same for the remaining embodiments.

Figure 9:
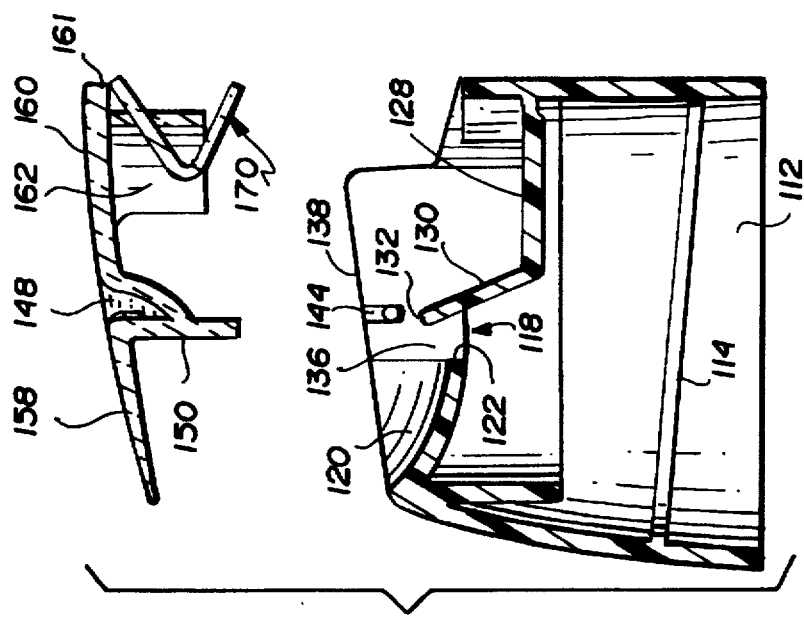
FIG. 9 is an exploded side section corresponding to FIG. 8.
Figure 8:
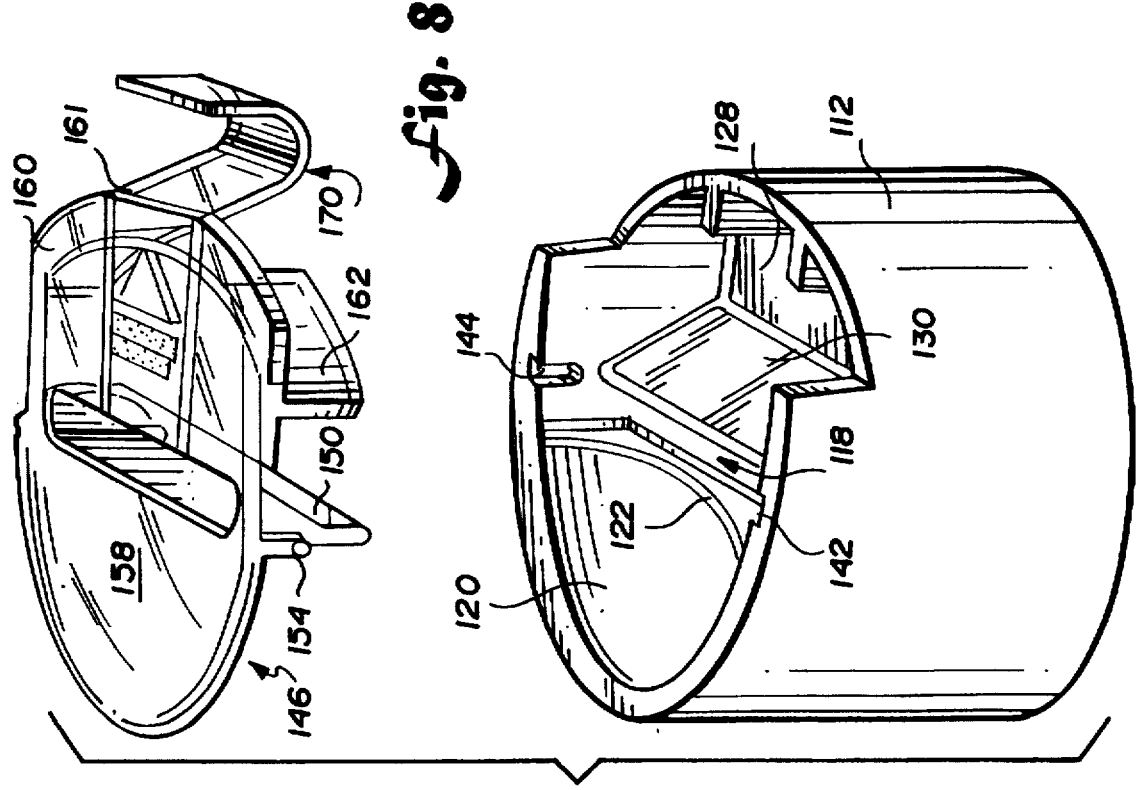
FIG. 8 is an exploded perspective view of a measuring/dispensing cap in accordance with a variation of the first exemplary embodiment of the invention.

In FIGS. 8 and 9, a variation of the embodiment shown in FIGS. 1–7 includes a different spring configuration. For convenience, similar reference numerals are used to indicate corresponding elements but with the prefix A1" added. In this embodiment, the spring 170 comprises a flexible flap formed along the back edge of the push panel 160, with a thinned area 161 creating a "living" hinge. The spring 170 may be folded back as shown in FIG. 9 to present an open-wedge or generally C-shaped configuration. When the lid is in place, the spring is compressed, thereby urging the dispensing panel 158 to a normally closed position. Thus, as in the case of the first described embodiment, the push panel 160 may be pressed downwardly against the bias of spring 170 and, upon release of the push panel, the spring 170 will automatically pivot the lid counterclockwise to a closed position. In this embodiment, no ribs corresponding to those at 74, 76 in the first described embodiment are required.

Figure 10:
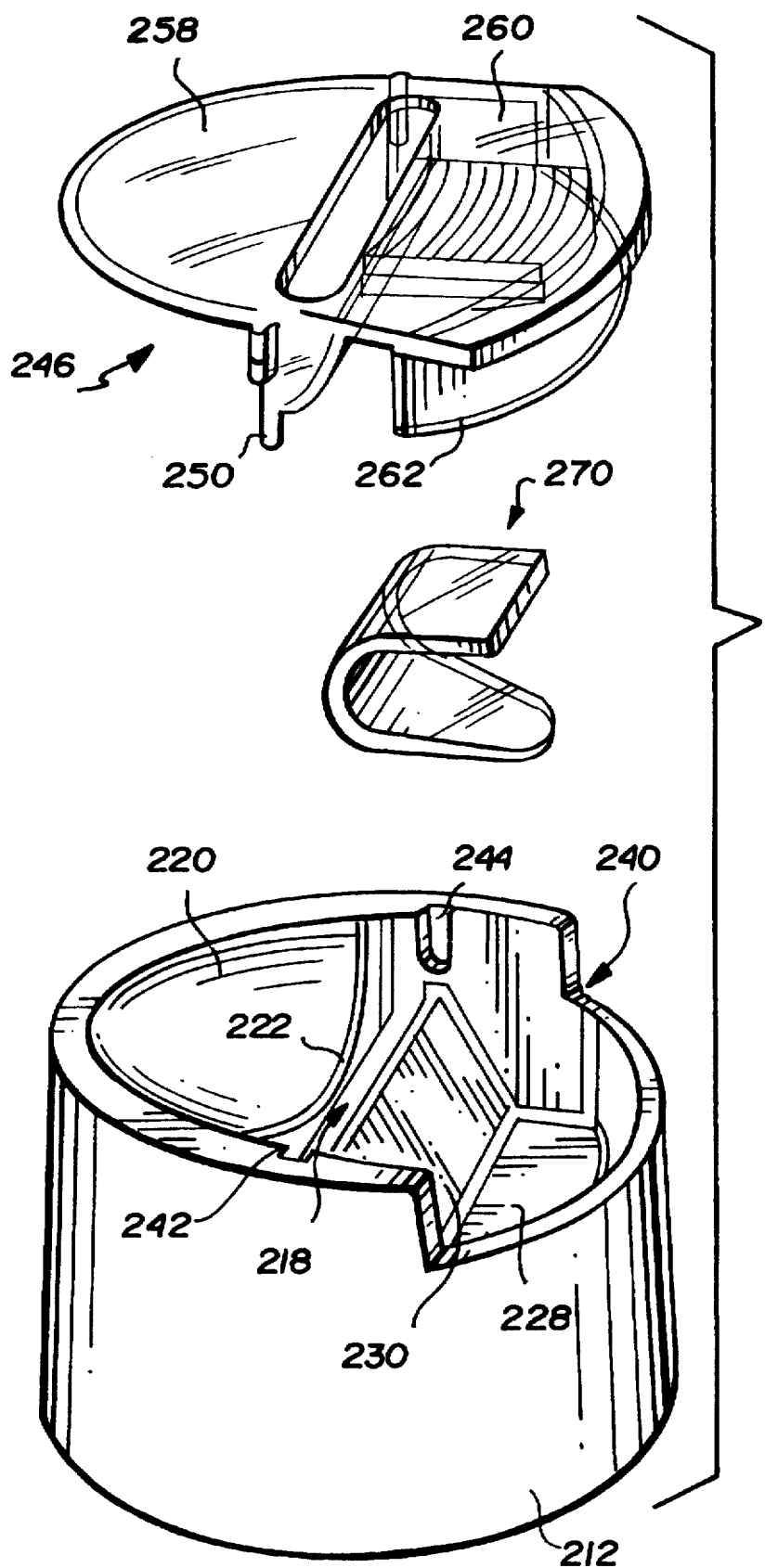
FIG. 10 is an exploded perspective view of a measuring/dispensing cap in accordance with another variation of the first embodiment of the invention.
Figure 11:
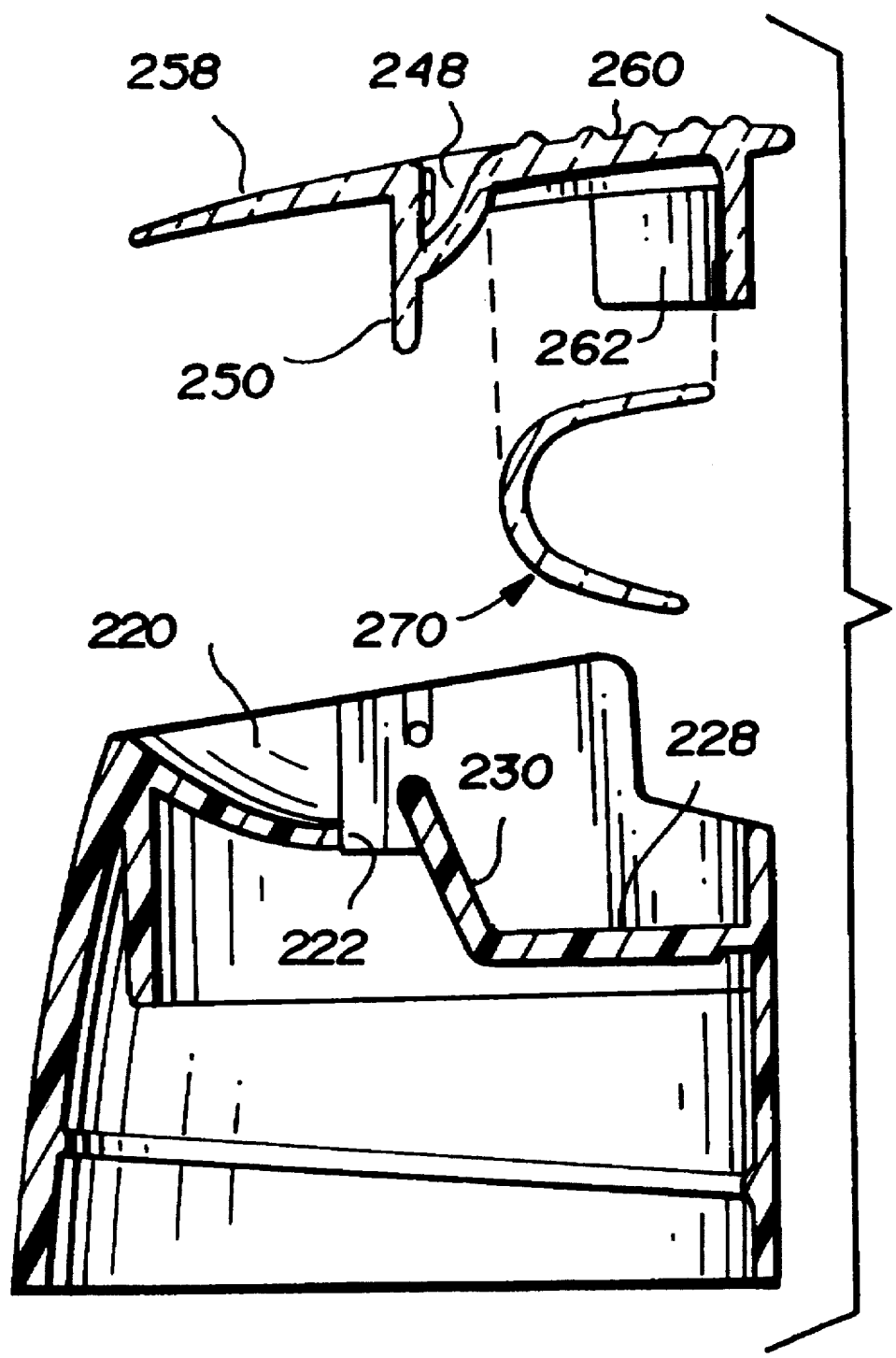
FIG. 11 is an exploded side section corresponding to FIG. 10.

Turning now to FIGS. 10 and 11, another variation is shown which utilizes a separate or discrete spring. Again, for convenience, similar reference numbers are used to indicate corresponding components, but with the prefix A2" added. Here, a discrete C-shaped spring 270 is utilized in place of the integral wedge-shaped spring 170, but the manner of operation remains substantially as described above.

In FIGS. 12 and 13, a die cut foam block 370 is inserted between the push panel 360 and the panel 318 and associated angled panel 330. The die cut foam spring 370 has a composition which allows it to be resiliently compressed when the push panel 360 is pressed downwardly, and which urges the dispensing panel 358 back to the closed position when the push panel 360 is released.

Figure 14:
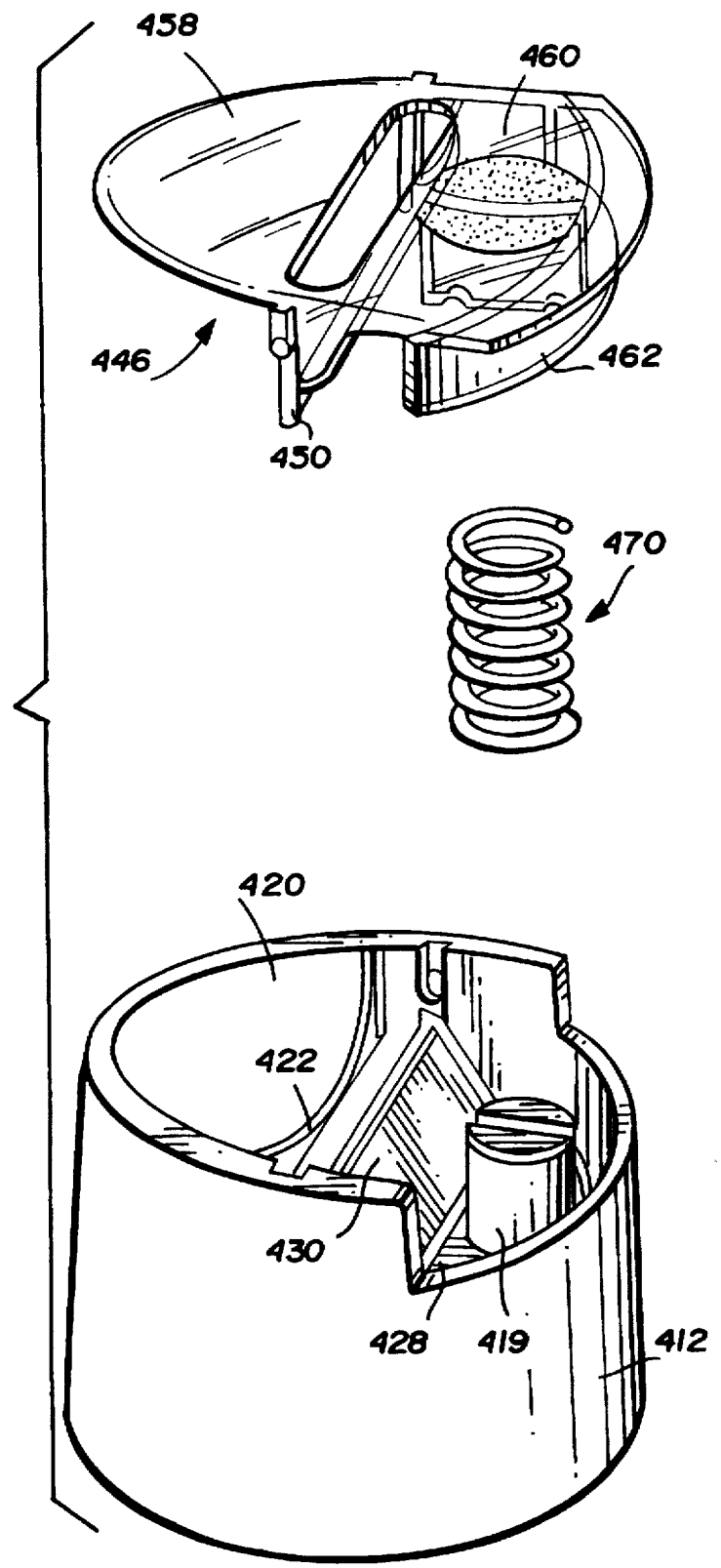
FIG. 14 is an exploded perspective view in accordance with still another variation of the first exemplary embodiment of the invention.
Figure 16:
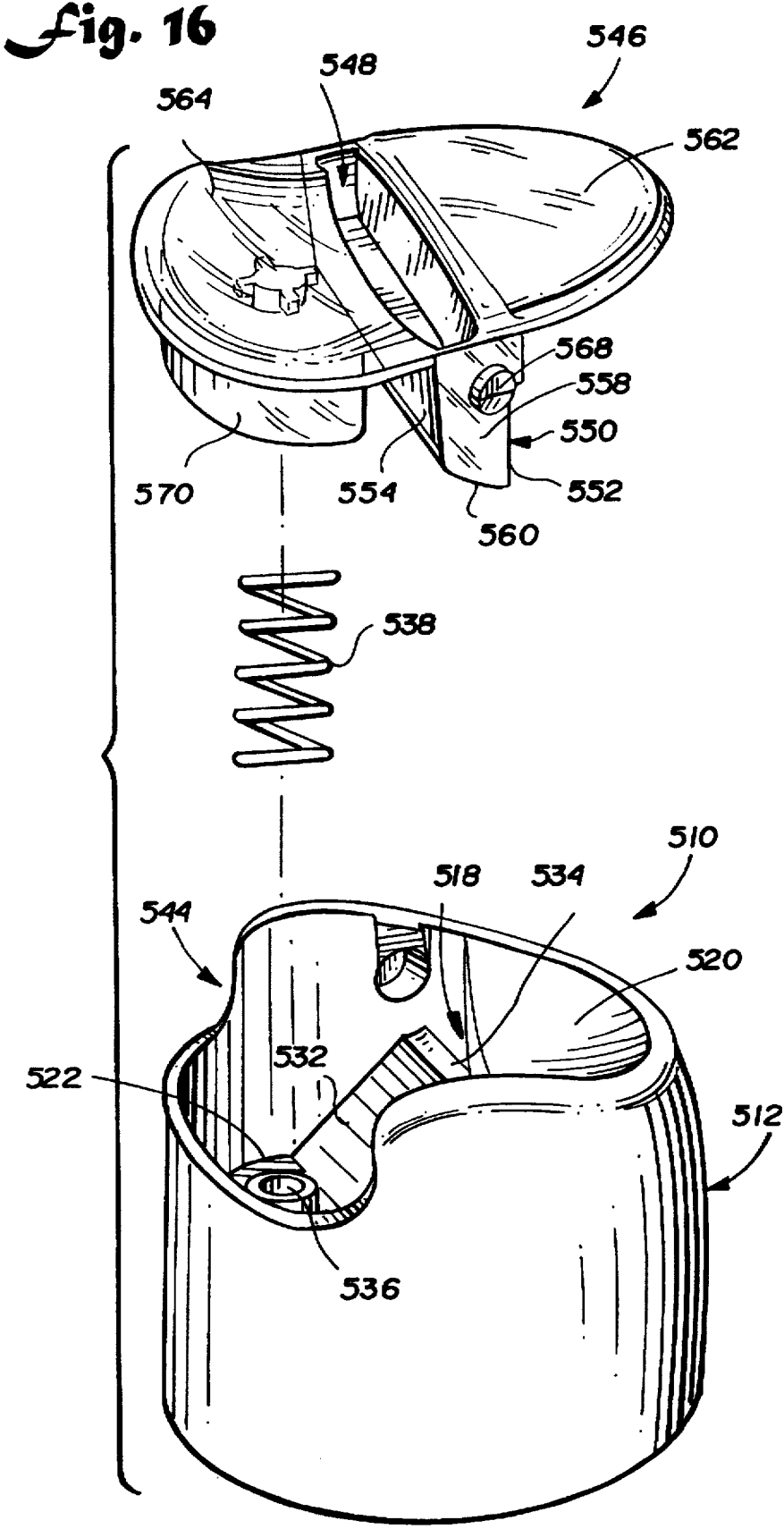
FIG. 16 is an exploded perspective view in accordance with a second and presently preferred embodiment of the invention.
Figure 17:
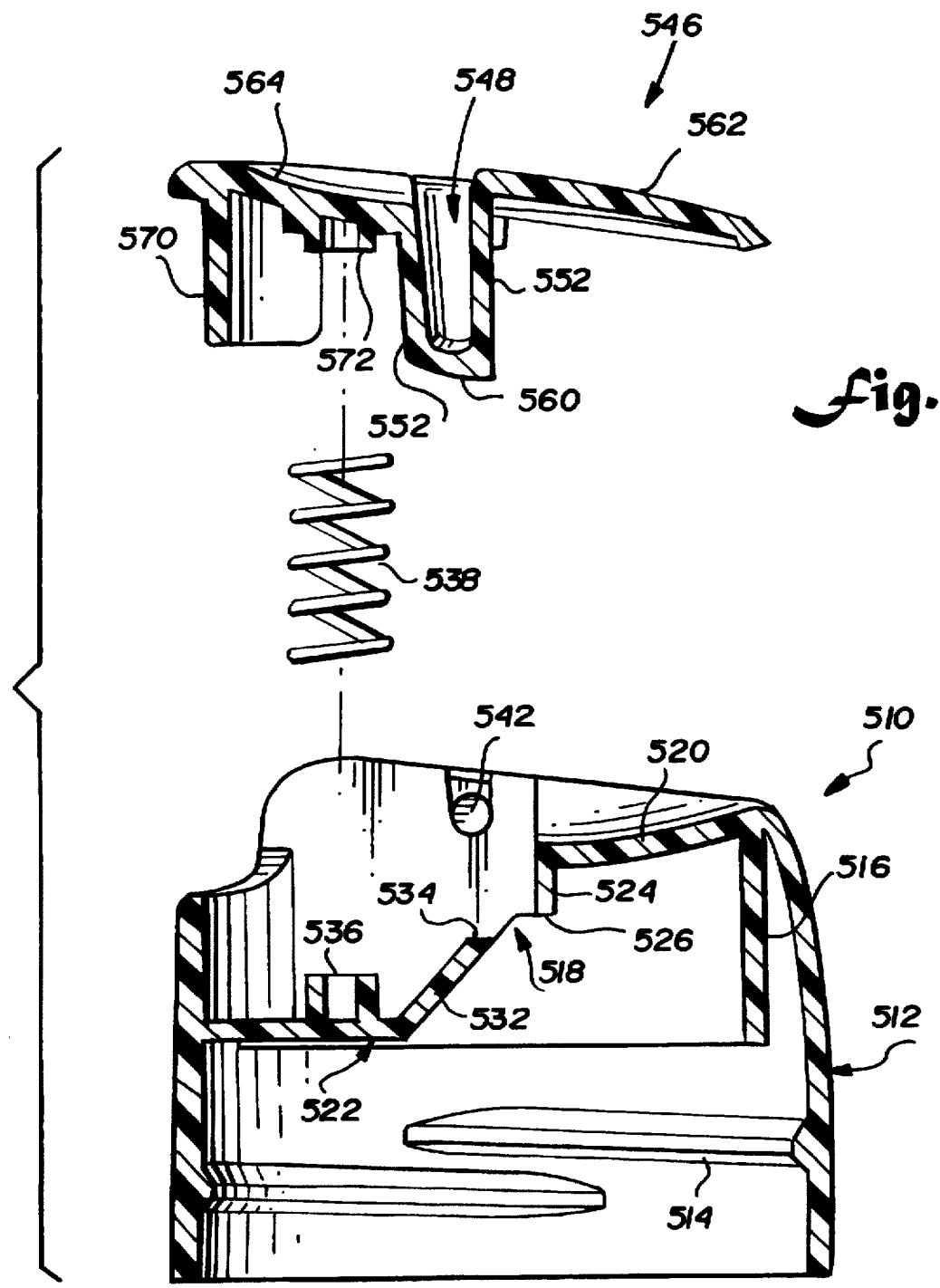
FIG. 17 is an exploded side section corresponding to FIG. 16.

In FIGS. 14 and 15, still another spring variation is shown. Here, a coil spring 470 is interposed between the underside of push panel 460 and the panel 428. To facilitate location and retention of the spring, an upstanding post 419 is formed on panel 428, for telescopingly receiving the coil spring 470.

Figure 18:
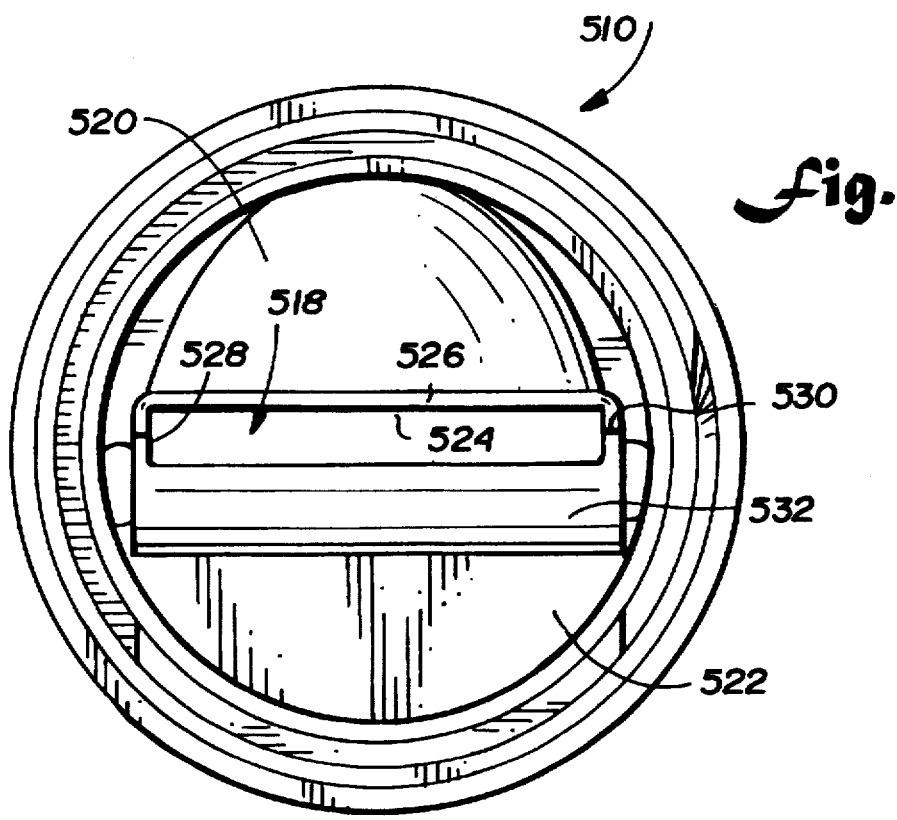
FIG. 18 is a bottom plan view of the closure with the flip top removed.
Figure 19:
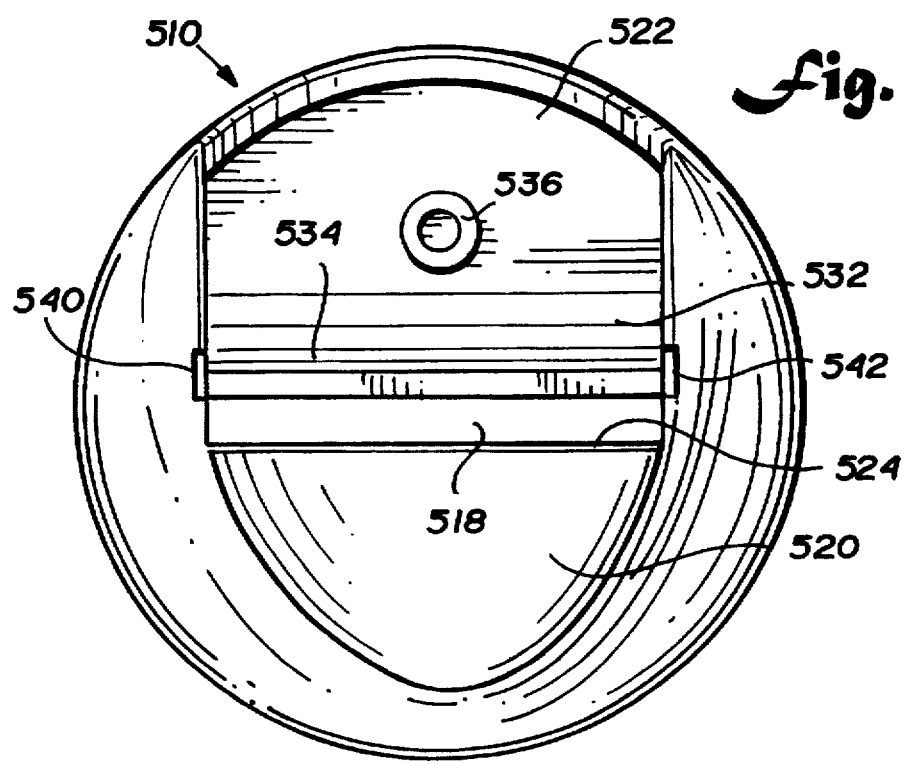
FIG. 19 is a top plan view of the closure with the flip top removed.
Figure 20:
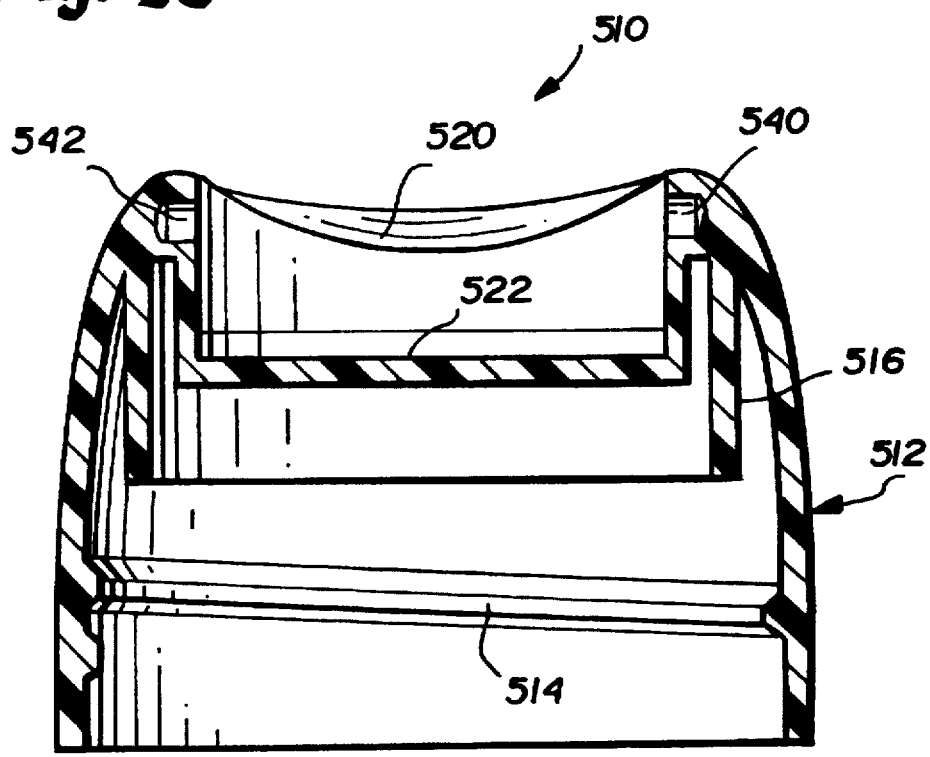
FIG. 20 is a rear sectional view of the closure with the flip top removed.
Figure 21:
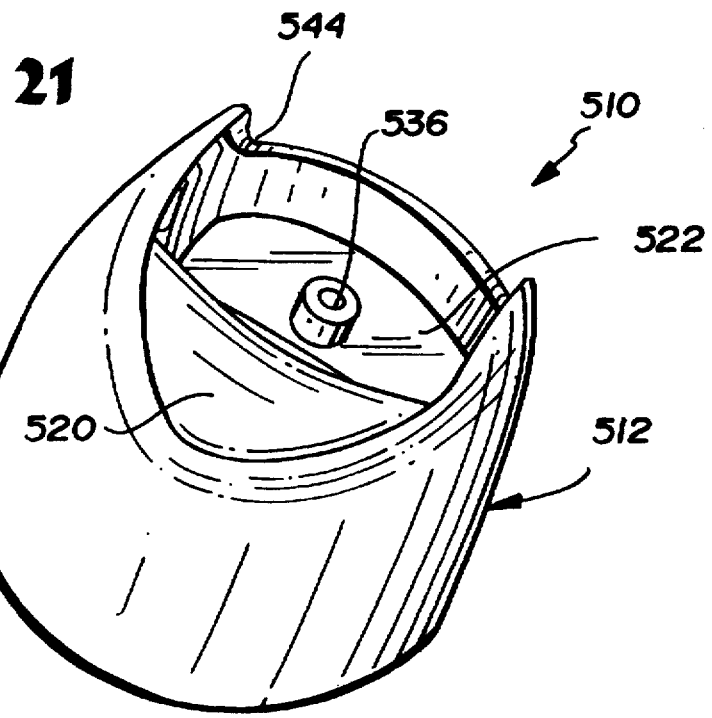
FIG. 21 is a perspective view of the closure with the flip top removed.
Figure 22:
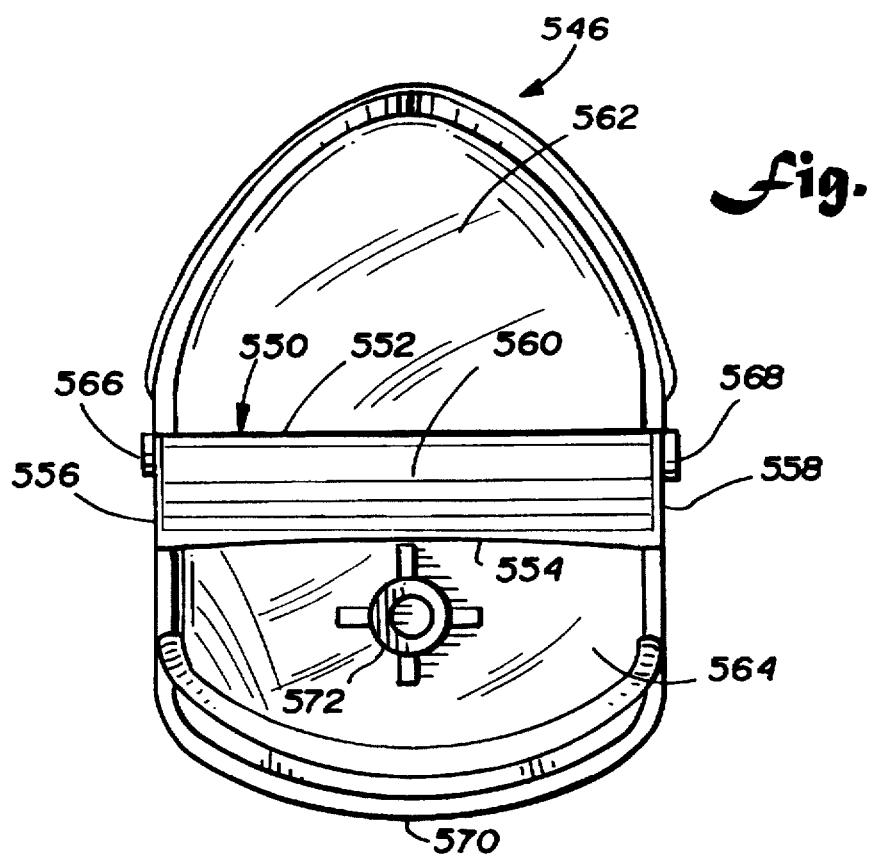
FIG. 22 is a bottom plan view of the flip top portion of the closure.
Figure 23:
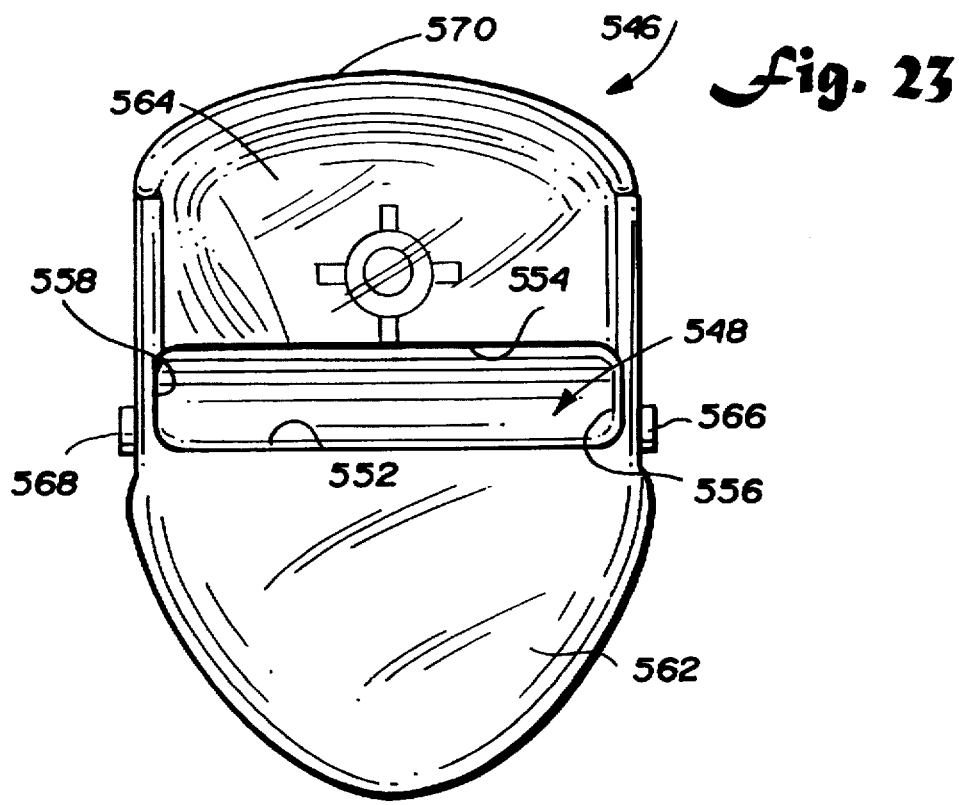
FIG. 23 is a top plan view of the flip top portion of the closure.
Figure 24:
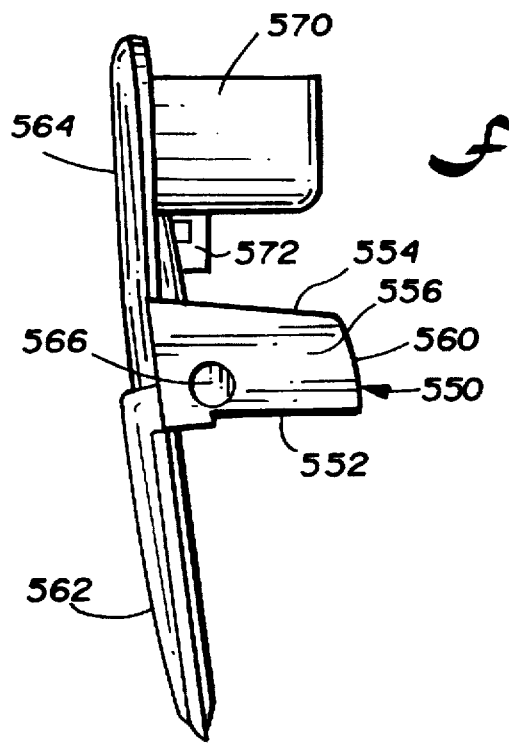
FIG. 24 is a side elevation of the flip top shown in FIG. 23.
Figure 25:
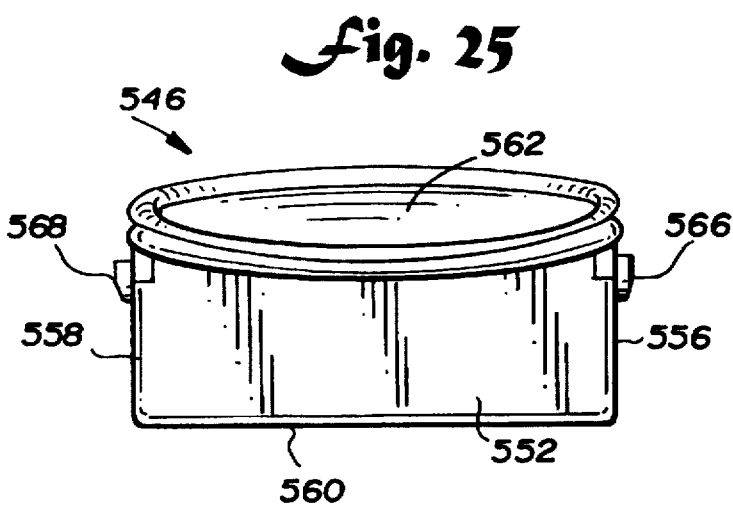
FIG. 25 is a front elevation of the flip top shown in FIG. 23.
Figure 26:
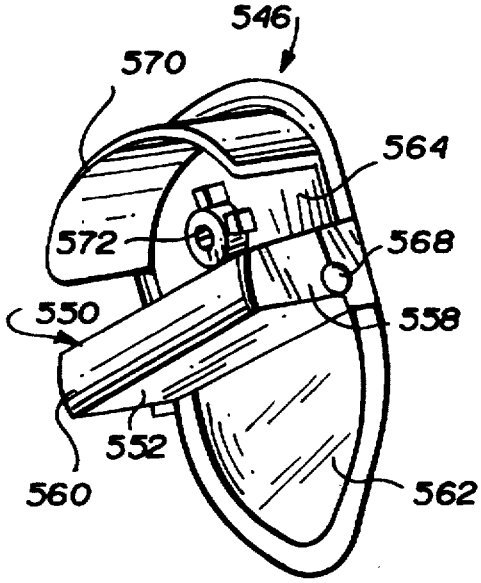
FIG. 26 is a lower left perspective view of the flip top shown in FIGS. 22 through 25.

Turning now to FIGS. 16–29, a preferred embodiment of the invention is disclosed which contains additional advantages over the previously described embodiments. With initial reference to FIGS. 16–21, the closure 510 includes a peripheral or outer skirt 512 provided on its interior surface with a thread 514 adapted for threaded engagement with a mating thread on the upper open end of an associated container C (see FIG. 29). The lower edge of a radially inner skirt 516 is adapted to engage the upper edge of the container to insure that the container contents flow only to the desired location within the closure as in the previously described embodiments. A substantially diametrical weir opening 518 has a diameter approximately the diameter of the radially inner skirt 516. The weir opening 518 is defined by a pair of interior panels 520 and 522. Panel 520 is a curved weir panel which extends downwardly and inwardly from the upper periphery of the closure, terminating at a vertical flange 524, defining a weir edge and one side of the opening 518. Flange 524 has a horizontal free edge 526 extending parallel to opening 518. The sides of the opening 518 are squared off by integral gussets 528, 530 (see FIG. 18).

Panel 522 extends inwardly toward the opening 518 from the opposite side of the closure, and includes an upwardly angled portion 532 which terminates along another horizontal, but slightly curved edge 534. The latter edge is slightly lower than the opposed edge 526, but the two edges 526, 534 and internal gussets 528, 530 define the rectangular weir opening 518.

The flat portion of panel 522 is provided with an integral, upstanding boss 536 which is adapted to hold and center a vertically oriented coil spring 538 which serves to bias the flip top to a closed position as described further below.

Note also that the upper portion of the cap is adapted to receive a flip top in a center pivot arrangement which permits the flip top to rock back and forth between closed and open positions. To this end, the cap is formed with opposed pivot pin recesses 540, 542 which serve to locate the pivot axis of the flip top in substantial vertical alignment with the edge 534 of panel 522, i.e., along the back edge of the weir opening 518.

The cap geometry also includes a recess 544 cut from the skirt in a manner similar to the earlier described embodiments, which facilitates the user's ability to move the flip top from the closed to the open position as described further below.

The flip top 546 has an overall shape similar to those previously described, the significant departure having to do with the shut-off blade configuration.

Briefly, the flip top 546 is traversed by a groove or recess 548 which defines a hollow, combined shut-off blade/sealing member which, from the underside of the flip top, appears as a box-like member or beam extending transversely of the flip top. Thus, the hollow beam is formed by a pair of parallel front and rear walls 552, 554, a pair of end walls 556, 558 and a bottom wall 560. The latter wall has a slight curvature as best seen in FIGS. 16, 24, 27 and 28.

The groove or recess 548 separates the flip top into a closure panel 562 and a push panel 564. The closure panel 562 combines with the weir panel 520 to form a measuring chamber as in the previously described embodiments.

Given the location of pivot pins 566, 568 which project laterally from either side of the flip top (see FIG. 22), it will be appreciated that the closure panel 562 will be pivoted to an open position when the push panel 564 is pressed downwardly. At the back end of the push panel 564, there is a depending skirt 570 which is curved about its periphery to substantially match (but fit inside) the curvature of the closure skirt along the edge of the recess 544 described above. At the same time, the push panel 564 extends peripherally just beyond the vertical edges of the recess so that when the lid is in place, the space between the push panel and the internal closure panel 522 is essentially sealed from debris (see FIGS. 27, 28).

Between the peripheral skirt 570, and the wall 554 on the underside of the flip top, there is a spring locating boss 572 which cooperates with the boss 536 for purposes of centering and holding the coil spring 538 in place.

Figure 27:
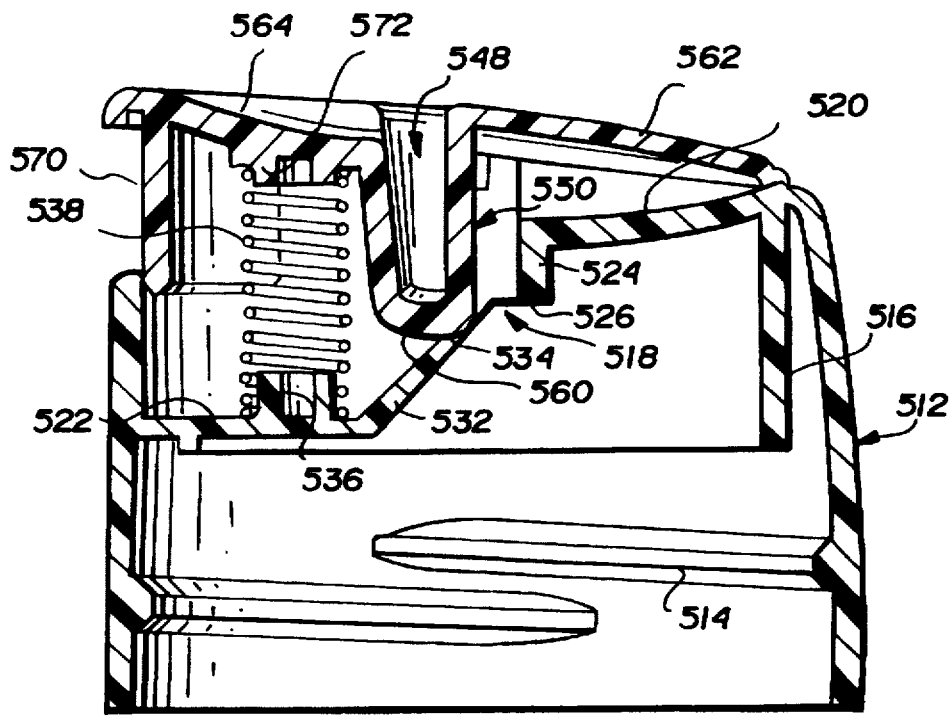
FIG. 27 is a side section of the closure with the flip top in place and in the closed position.
Figure 28:
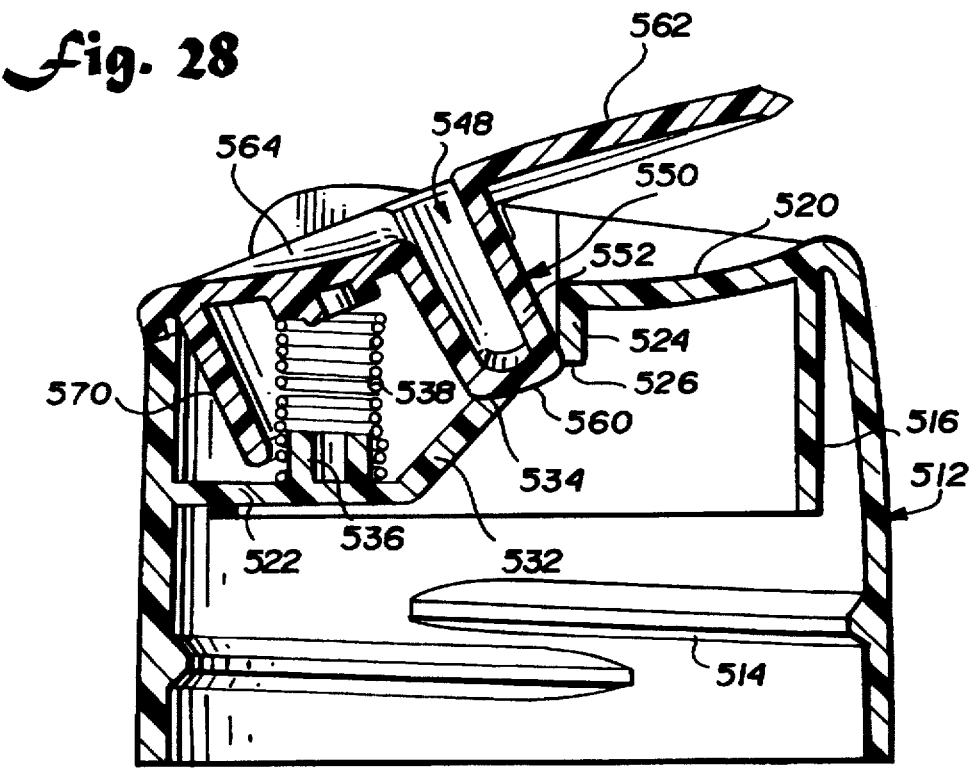
FIG. 28 is a side section similar to FIG. 27 but with the flip top in an open position.
Figure 29:
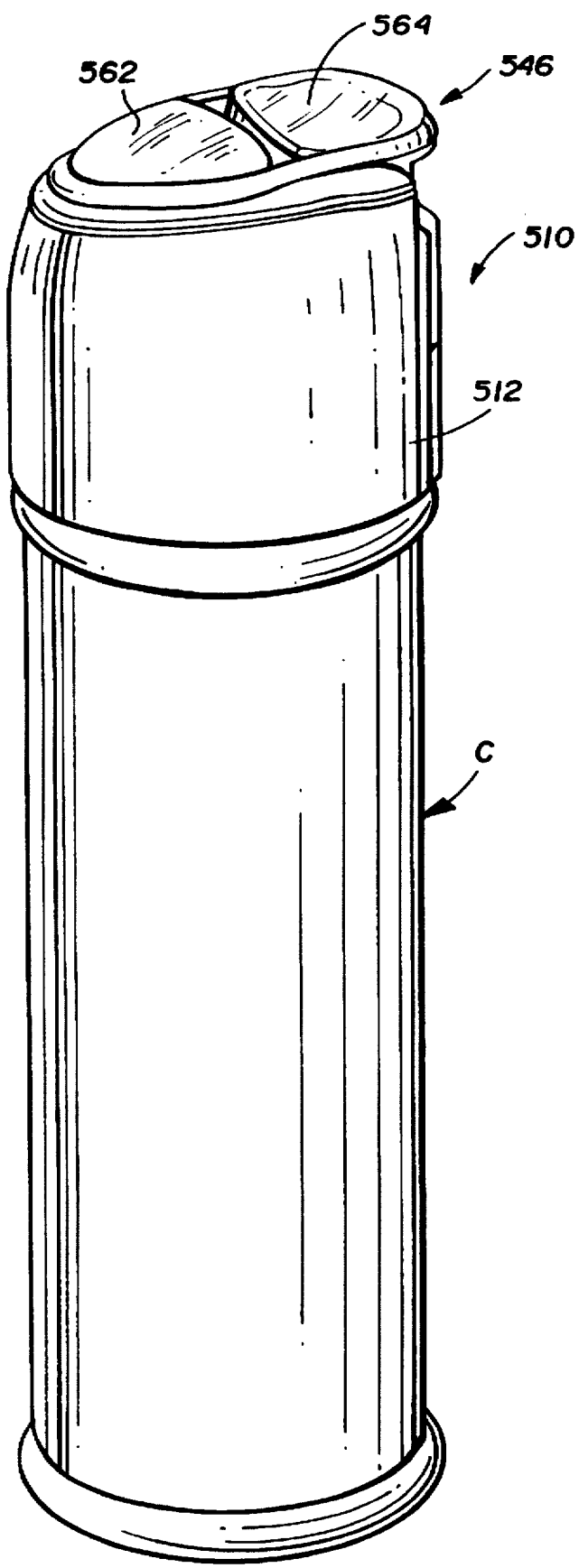
FIG. 29 is a perspective view of a container with the closure in accordance with the preferred embodiment of the invention in place.

With reference now especially to FIGS. 27 and 28, when the flip top is in the closed position, the slightly curved bottom wall 560 of the shut off/sealing beam 550 is seated on the horizontal edge 534 of the inclined or angled portion 532 of the panel 522. In this position, it is readily apparent that the weir opening 518 is available for transferring contents from the container body to the measuring chamber within the flip top simply by tilting the container to the extent necessary to have the contents flow through the weir opening 518 into the measuring chamber. Then, with the appropriate amount of contents captured within the measuring chamber, the container can be tilted in the opposite direction sufficient so that the weir panel 520 prevents additional contents from flowing into the measuring chamber. The flip top 546 is then depressed in the push panel portion 564 to open the flip top as best seen in FIG. 28. As the flip top opens, the curved bottom wall surface 560 of the beam 550 wipes across the horizontal mating edge 534. In the fully open position, the forward wall 552 (the "shut off" wall) seals against the free edge 526 of the flange 524 to insure that no additional contents flow into the measuring chamber as the measured amount is dispensed from the flip top. At the same time, the bottom wall remains seated on the horizontal edge 534 of the panel 522, preventing container contents from clogging and migrating into the area of the coil spring.

After the contents have been dispensed, and upon release of the push panel portion 564, the spring 538 biases the flip top 546 to the closed position. As the flip top closes, the bottom wall 560 again wipes across the horizontal edge 534 so that any container contents sticking to the bottom wall 560 are wiped free, again preventing clogging and migration of contents into the area of the coil spring 538.

The above arrangement insures repeated free movement of the flip top 546 without any possibility of interrupted movement by reason of clogging of the container contents within the flip top mechanism.

In all of the above embodiments, it is preferred that the flip tops (and the closure body if desired) be made of clear transparent plastic material so that the user is able to determine the presence or absence of contents shaken or poured through the weir opening into the measuring chamber, and also to adjust the amount of contents in that chamber by either adding material through the weir opening 18, or by shaking some of the material back into the container through the same weir opening. In this way, the user is sure to dispense only the desired predetermined amount of contents from the closure. It should be understood that the size of the measuring chamber can be varied for particular applications. For example, for contents such as sweeteners which are typically packaged in small paper packets, the chamber can be sized to hold the equivalent of one packet, when the transferred contents reach the level of the weir edge with the container tilted sideways. Volume indicators may be formed or printed on the closure panel if desired.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A dispensing cap for a container comprising a peripheral side wall and a pivotable flip top movable between closed and open positions, said flip top mounted for pivotal motion about a horizontal hinge axis wherein said hinge axis separates a closure panel of said flip top from a push panel of said flip top; a first panel within said side wall having a first free edge in substantially vertical alignment with said hinge axis; a second panel having a weir edge extending parallel to and laterally spaced from said first free edge, thus establishing a weir opening between said first free edge and said weir edge, said closure panel and said second panel along with a portion of said peripheral side wall defining a measuring chamber within said cap, adapted to receive contents of a container passing through said weir opening.

2. The dispensing cap of claim 1 wherein said first internal panel includes a flat section and an upwardly angled section, said first free edge extending along an upper end of said angled section.

3. The dispensing cap of claim 1 wherein said flip top has a substantially flat shut-off blade extending downwardly from a lower surface thereof, and further wherein said shut-off blade is engaged with said first internal panel along said first free edge when said flip top is in the closed position, and engaged with and along said weir edge when said flip top is in the open position.

4. The dispensing cap of claim 3 wherein a spring is located between said push panel portion and said first internal panel to normally bias said flip top to the closed position.

5. The dispensing cap of claim 4 wherein said spring comprises an elongated flexible flap extending downwardly from said lower surface, and substantially parallel to said shut-off blade.

6. The dispensing cap of claim 4 wherein said spring comprises a bendable flap integrally fixed to an end of said push panel remote from said hinge axis.

7. The dispensing cap of claim 4 wherein said spring comprises a substantially C-shaped member.

8. The dispensing cap of claim 4 wherein said spring comprises a coil spring.

9. The dispensing cap of claim 8 wherein said lower surface of said flip top and said first internal panel include means for locating and retaining said coil spring.

10. The dispensing cap of claim 4 wherein said spring comprises a foam block.

11. The dispensing cap of claim 1 wherein said first free edge is horizontally oriented, and wherein said flip top is formed with a downwardly projecting shut off/sealing member having a substantially horizontal wiper surface which engages said first free edge as said flip top moves between open and closed positions.

12. The dispensing cap of claim 11 wherein said downwardly projecting sealing member also includes a shut-off surface which engages said weir edge when said flip top is in the open position.

13. The dispensing cap of claim 12 wherein said weir edge lies horizontally along a vertical flange of the weir panel.

14. The dispensing cap of claim 11 wherein a spring is located between said push panel portion and said first internal panel to normally bias said flip top to the closed position.

15. The dispensing cap of claim 14 wherein said spring comprises a coil spring.

16. The dispensing cap of claim 15 wherein said lower surface of said flip top and said first internal panel include means for locating and retaining said coil spring.

17. The dispensing cap of claim 1 in combination with a container, said cap detachably mounted on said container.

* * * * *